(12) United States Patent
Hegazy et al.

(10) Patent No.: US 9,390,555 B2
(45) Date of Patent: Jul. 12, 2016

(54) METHOD TO ASSESS THE IMPACT OF EXISTING FRACTURES AND FAULTS FOR RESERVOIR MANAGEMENT

(71) Applicants: International Business Machines Corporation, Armonk, NY (US); Centro de Tecnologia de Repsol, Madrid (ES)

(72) Inventors: Mohamed Ahmed Hegazy, Madrid (ES); Mookanahallipatna Ramasesha Lakshmikantha, Madrid (ES); Jose Maria Segura Serra, Cardona (ES); Leopoldo Luis Cabo Penna Franca, Rio de Janeiro (BR); Ulisses T. Mello, Blauvelt, NY (US); Eduardo Rocha Rodrigues, Rio de Janeiro (BR)

(73) Assignees: International Business Machines Corporation, Armonk, NY (US); Repsol, S.A., Madrid (ES)

( * ) Notice: Subject to any disclaimer, the term of this patent is extended or adjusted under 35 U.S.C. 154(b) by 650 days.

(21) Appl. No.: 13/673,495

(22) Filed: Nov. 9, 2012

(65) Prior Publication Data

US 2014/0136158 A1    May 15, 2014

(51) Int. Cl.
| | |
|---|---|
| G06F 7/60 | (2006.01) |
| G06G 7/48 | (2006.01) |
| G06T 17/20 | (2006.01) |
| E21B 43/26 | (2006.01) |
| G06F 17/50 | (2006.01) |
| G06T 17/05 | (2011.01) |
| G01V 99/00 | (2009.01) |

(52) U.S. Cl.
CPC .............. *G06T 17/20* (2013.01); *E21B 43/26* (2013.01); *G01V 99/005* (2013.01); *G06F 17/5018* (2013.01); *G06T 17/05* (2013.01); *G01V 2210/642* (2013.01); *G01V 2210/646* (2013.01); *G06F 2217/16* (2013.01)

(58) Field of Classification Search
None
See application file for complete search history.

(56) References Cited

U.S. PATENT DOCUMENTS

| | | | | |
|---|---|---|---|---|
| 6,018,497 A | * | 1/2000 | Gunasekera | 367/72 |
| 6,106,561 A | * | 8/2000 | Farmer | 703/10 |

(Continued)

OTHER PUBLICATIONS

International Search Report dated Sep. 10, 2014, issued in corresponding International Application No. PCT/EP2013/073331.

(Continued)

*Primary Examiner* — Omar Fernandez Rivas
*Assistant Examiner* — Nithya J Moll
(74) *Attorney, Agent, or Firm* — Scully, Scott, Murphy & Presser, P.C.; Louis J. Percello, Esq.

(57) ABSTRACT

Assessing the impact of existing fractures and faults for reservoir management, in one aspect, may comprise employing a numerical mesh to generate a geomechanical model, the numerical mesh representing a geological reservoir and its surrounding regions, the numerical mesh comprising delimitation associated with regions and layering of geology without constraining the numerical mesh to explicitly represent a fault or fracture, initializing the geomechanical model to define initial stress-strain compatible with measured stress in well locations associated with the geological reservoir, generating a fluid-flow model employing the numerical mesh, solving for a coupled solution of the fluid-flow model and the geomechanical model, and employing the solved fluid-flow model and the geomechanical model to assess the impact.

23 Claims, 4 Drawing Sheets

(56) References Cited

U.S. PATENT DOCUMENTS

| | | |
|---|---|---|
| 6,907,392 B2 * | 6/2005 | Bennis et al. ............... 703/10 |
| 7,603,265 B2 | 10/2009 | Mainguy et al. |
| 2006/0153005 A1 * | 7/2006 | Herwanger et al. ............ 367/38 |
| 2009/0125280 A1 | 5/2009 | Soliman et al. |
| 2009/0248374 A1 | 10/2009 | Huang et al. |
| 2010/0088076 A1 | 4/2010 | Koutsabeloulis et al. |
| 2010/0138196 A1 | 6/2010 | Hui et al. |
| 2010/0191511 A1 | 7/2010 | Hsu et al. |
| 2011/0029293 A1 | 2/2011 | Petty et al. |
| 2011/0077918 A1 | 3/2011 | Mutlu et al. |
| 2011/0208431 A1 * | 8/2011 | Skelt ............................ 702/7 |
| 2011/0246159 A1 | 10/2011 | Herwanger et al. |

OTHER PUBLICATIONS

Zoback, M.D., et al. "Determination of stress orientation and magnitude in deep wells", International Journal of Rock Mechanics & Mining Sciences 40 (2003) 1049-1076.

* cited by examiner

METHOD TO ASSESS THE IMPACT OF EXISTING FRACTURES AND FAULTS FOR RESERVOIR MANAGEMENT

FIELD

The present application relates generally to natural resources reservoirs such as oil and gas reservoirs and management thereof, and more particularly to assessing impact of existing fractures and faults for reservoir management, e.g., associated with hydrocarbon production.

BACKGROUND

When hydrocarbons are produced, pore pressure reduction is induced. Pore pressure reduction, in turn, causes the increase of the effective stress in the reservoir solid framework. This change of effective stress alters the physical properties of the reservoirs such as porosity and permeability as well as the behavior of fractures and faults within the reservoir. Depending on the state of stress, existing fractures may behave as conduits or barriers to the flow of fluids (e.g., oil, gas, and water, etc.). For example, if the stress tensor rotates, a previously closed fracture network could open allowing preferential flow along the direction of the network, which would require a change in the reservoir management strategy for the oil field production.

Known solutions involve the modeling of the reservoir stress field using techniques that explicitly requires a numerical mesh to represent the reservoir with the exiting faults and fractures explicitly defined and discretized in the numerical mesh. However, given the uncertainty of the position of existing faults/fractures within the reservoir, it is common to create alternative scenarios for the position of the fractures/faults in the reservoir. In known solutions, each new scenario would require a distinct numerical mesh, or the remesh of the initial scenario.

Another drawback of the known solutions is the fact that they try to predict fracture initiation and propagation dynamically, which requires constant remeshing, and thus demanding significant computational resources. Given that is difficult to know the exact distribution of properties in the subsurface reservoir because of the lack of direct measurements, trying to predict the initiation and propagation of fractures and faults may produce results that are very different from reality.

BRIEF SUMMARY

A method and system to assess the impact of existing fractures and faults for reservoir management may be provided. The method, in one aspect, may comprise generating a geological and reservoir model employing information from seismic data, well log, and well production data. The method may further comprise defining one or more locations of one or more pre-existing geological faults or fractures or combination thereof. The method may also comprise creating a numerical mesh that represents the generated geological model comprising delimitation associated with regions and layering of geology without constraining the numerical mesh to explicitly represent a fault or fracture. The method may further comprise locating mesh elements from the numerical mesh that intersect the defined one or more locations. The method may further comprise discretizing mesh elements of the numerical mesh that do not intersect the defined one or more locations of one or more pre-existing geological faults or fractures or combination thereof, according to a first numerical method. The method may also comprise discretizing the located mesh elements that intersect the defined one or more locations of one or more pre-existing geological faults or fractures or combination thereof, according to a second numerical method. The method may further comprise populating the numerical mesh elements with mechanical and flow properties, the populated numerical mesh forming a geomechanical model employed for assessing the impact of existing fractures and faults.

A system to assess the impact of existing fractures and faults for reservoir management, in one aspect, may comprise an impact assessment module operable to generate a geological and reservoir model employing information from seismic data, well log, and well production data. The impact assessment module may be further operable to define one or more locations of one or more pre-existing geological faults or fractures or combination thereof. The impact assessment module may be also operable to create a numerical mesh that represents the generated geological model comprising delimitation associated with regions and layering of geology without constraining the numerical mesh to explicitly represent a fault or fracture. The impact assessment module may be further operable to locate mesh elements from the numerical mesh that intersect the defined one or more locations. The impact assessment module may be further operable to discretize mesh elements of the numerical mesh that do not intersect the defined one or more locations of one or more pre-existing geological faults or fractures or combination thereof, according to a first numerical method. The impact assessment module may be further operable to discretize the located mesh elements that intersect the defined one or more locations of one or more pre-existing geological faults or fractures or combination thereof, according to a second numerical method. The impact assessment module may be further operable to populate the numerical mesh elements with mechanical and flow properties, the populated numerical mesh forming a geomechanical model.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

In one embodiment of the present disclosure, evaluating the impact of changes in the stress field within reservoirs associated with hydrocarbon production is presented. A method in one aspect of the present disclosure does not require an explicit representation of the faults and fractures in the mesh and explicit re-meshing when the location of faults and fractures are changed during the workflow of estimating changes of effective stress and its impact. Instead, the same numerical mesh for all alternative scenarios may be used. In one embodiment of the present disclosure, the change in the position of the fractures and/or fault is taken care of implicitly using the eXtented Finite Element Method (XFEM) approach employing the same numerical mesh. In another aspect, only information of existing fracture and faults visible in seismic sections is used.

A method to assess the impact of existing fracture and faults within reservoirs of the present disclosure in one embodiment is able to use the same numerical mesh for both the fluid flow and the geomechanical model. This approach does not require explicit geometrical representation of discontinuities (fractures and/or faults) in the numerical mesh and thus the numerical mesh can be arbitrary or generic. This facilitates substantially the modeling workflow because one would not require one to remesh the model when new discontinuities have to be embedded in the model.

Figure 1:
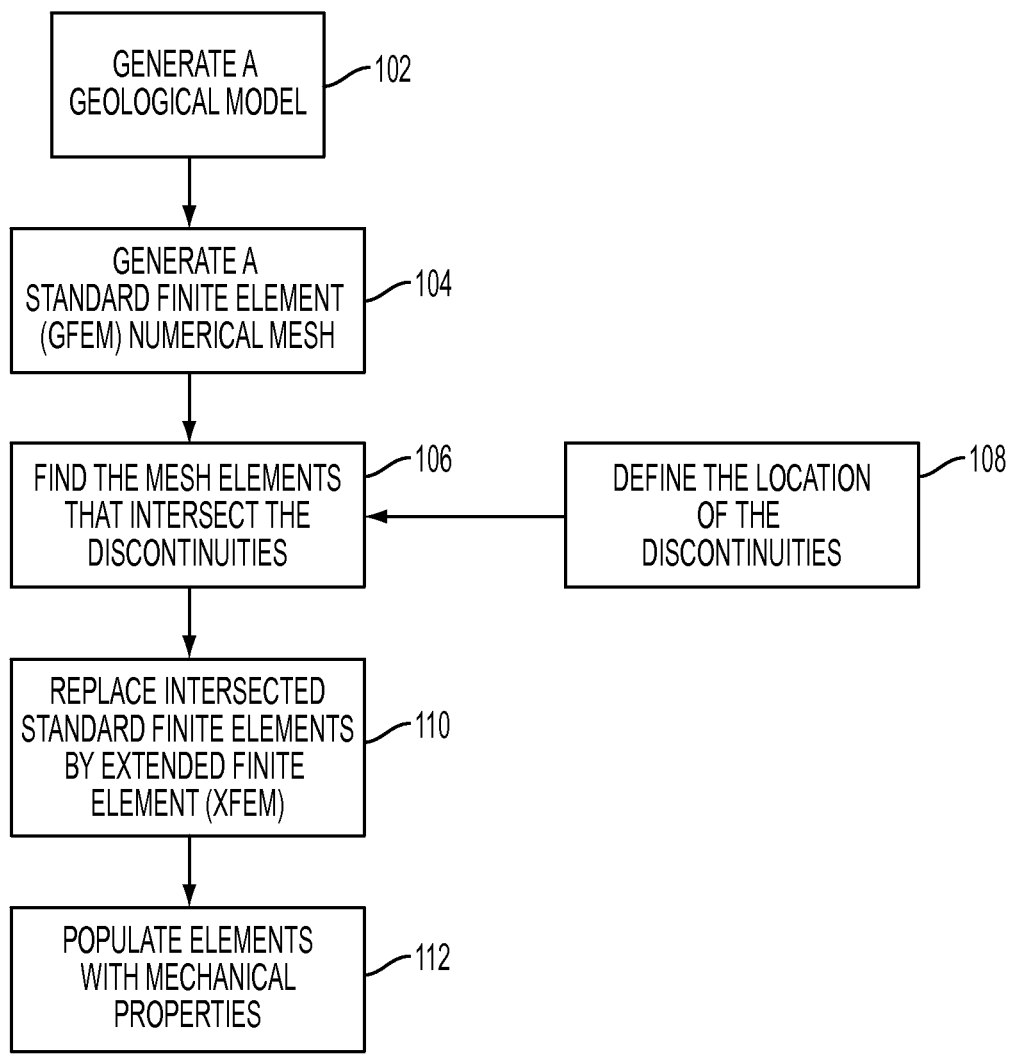
FIG. 1 illustrates a method for assessing the impact of existing fractures and faults for reservoir management in one embodiment of the present disclosure.

FIG. 1 illustrates a method for assessing the impact of existing fractures and faults for reservoir management in one embodiment of the present disclosure. At 102, a geological and reservoir model is generated using information from seismic data, well logs, and well production data. The resulting model contains the reservoir, and surrounding regions (overburden, underburden, and sideburden). Each of these regions has mechanical properties associated with them. These properties are derived from input data. The location of pre-existing faults and fractures are defined during the interpretation of seismic data and well log (e.g., FMI log). Their geometry is defined as polygonal surfaces.

At 104, a numerical mesh is created to represent the geological model taking into consideration the delimitation of the regions and layering of the geology without constraining the mesh to represent faults and fractures explicitly.

Figure 2A:
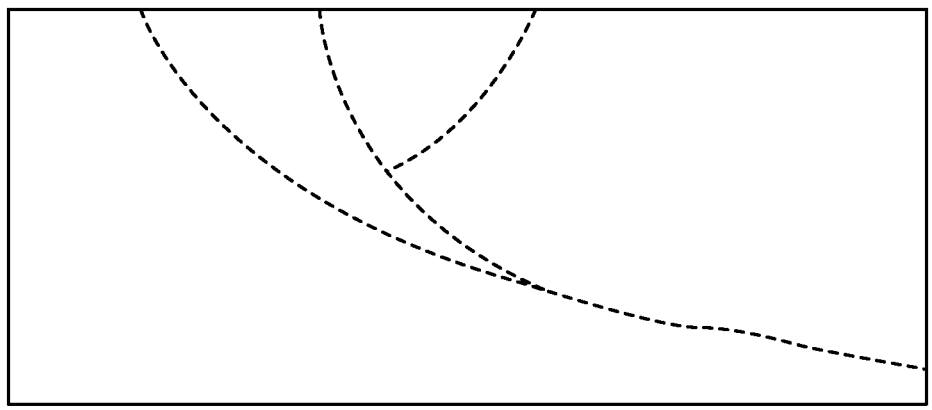
FIG. 2A is a diagram showing an example schematic model with faults represented by dotted lines in one embodiment of the present disclosure.
Figure 2B:
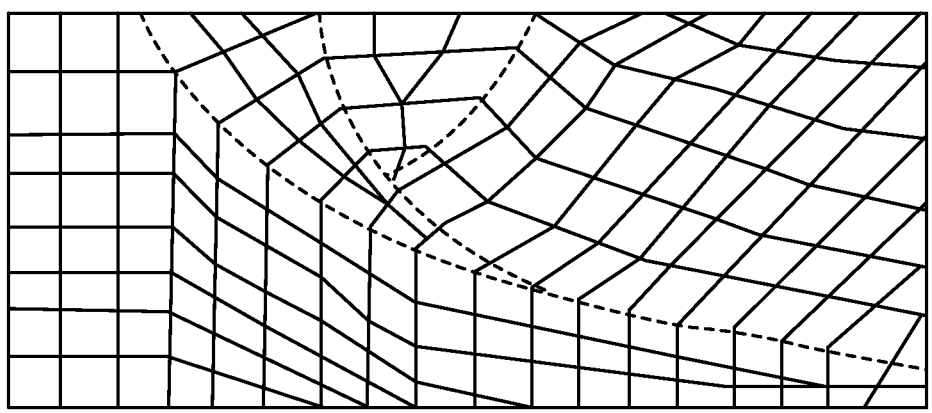
FIG. 2B is a diagram showing an example of an unstructured mesh conformal to the faults in one embodiment of the present disclosure.
Figure 2C:
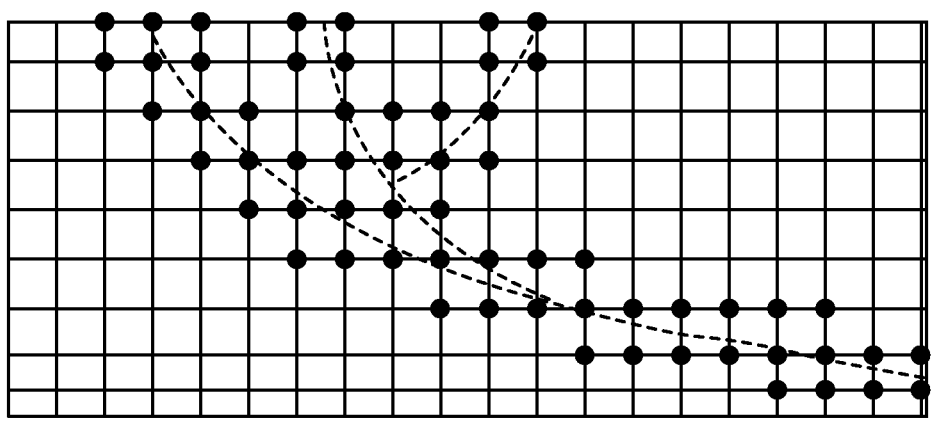
FIG. 2C is a diagram showing an example Cartesian mesh with enriched elements for the elements that intersect the faults with enriched nodes marked with solid black nodes in one embodiment of the present disclosure.

FIG. 2A shows a simplified cross section of a schematic model with three faults represented by dotted lines. FIG. 2B shows an unstructured mesh constrained by or conformal to the faults. The mesh shown in FIG. 2B has the drawback in that if during the analysis the fault interpretation is required to change its location (to obtain a better fit between the stress/pressure calculations and observations), a new mesh has to be created. FIG. 2C shows a mesh in which its cells or elements are not constrained, or conformal, to the pre-existing faults. It is a Cartesian mesh with enriched elements for the elements that intersect the faults. Enriched nodes are marked with solid black nodes.

With polygonal surfaces representing faults and fractures and the numerical mesh, all the mesh elements which are intersected by the faults are located. For instance, at 108 the locations of discontinuities (e.g., faults and/or fractures) are defined, e.g., during the seismic and well log (e.g., FMI log) interpretation process. At 106, mesh elements from the numerical mesh (generated at 104) that intersect the defined locations of the discontinuities are identified.

At 110, the elements not intersected are discretized according to one numerical method (also referred to in this disclosure as a first numerical method), e.g., with traditional Galerkin Finite Elements (GFEM), that models continuities. The elements intersected are discretized according another numerical method (also referred to in this disclosure as a second numerical method), e.g., with eXtended Finite Elements (XFEM) that have enriched basis functions to model the discontinuities in the strain and stress embedded in the elements.

At 112, the elements of the mesh are populated with mechanical and flow properties. Examples of mechanical properties include but are not limited to elastic, plastic, viscoplastic, viscoelastic properties. Example flow properties include but are not limited to permeability and porosity. The resulting model (mesh) is called a geomechanical model input of the reservoir and surrounding regions. The mesh is a representation of the solid and fluid models. Each element of the mesh is composed by solid and fluid phases. The solid framework is porous and its framework has mechanical properties (e.g., strength, compressibility, etc.) and flow properties (porosity, absolute permeability). The porous space framework is filled with fluids (water, oil, and gas, for example). The fluid also has its own physical properties (e.g., compressibility, thermal expansion, etc.). There are rock-fluid properties due to the interactions of fluid and solids (e.g., relative permeability). The overall bulk mechanical properties of the solid framework plus the fluids are the result of the combination of the solid framework and the fluid properties. All these properties are represented in a single mesh. An element of the mesh has solid and fluid properties such as porosity, permeability, fluid density, young's modulus (if elastic), relative permeability, rock type, fluid saturation of each fluid phase, etc. The fluid flow model can use the same mesh or a derived mesh with different resolution, provided the fluid flow mesh is updated from the estimations from the geomechanical model.

Figure 3:
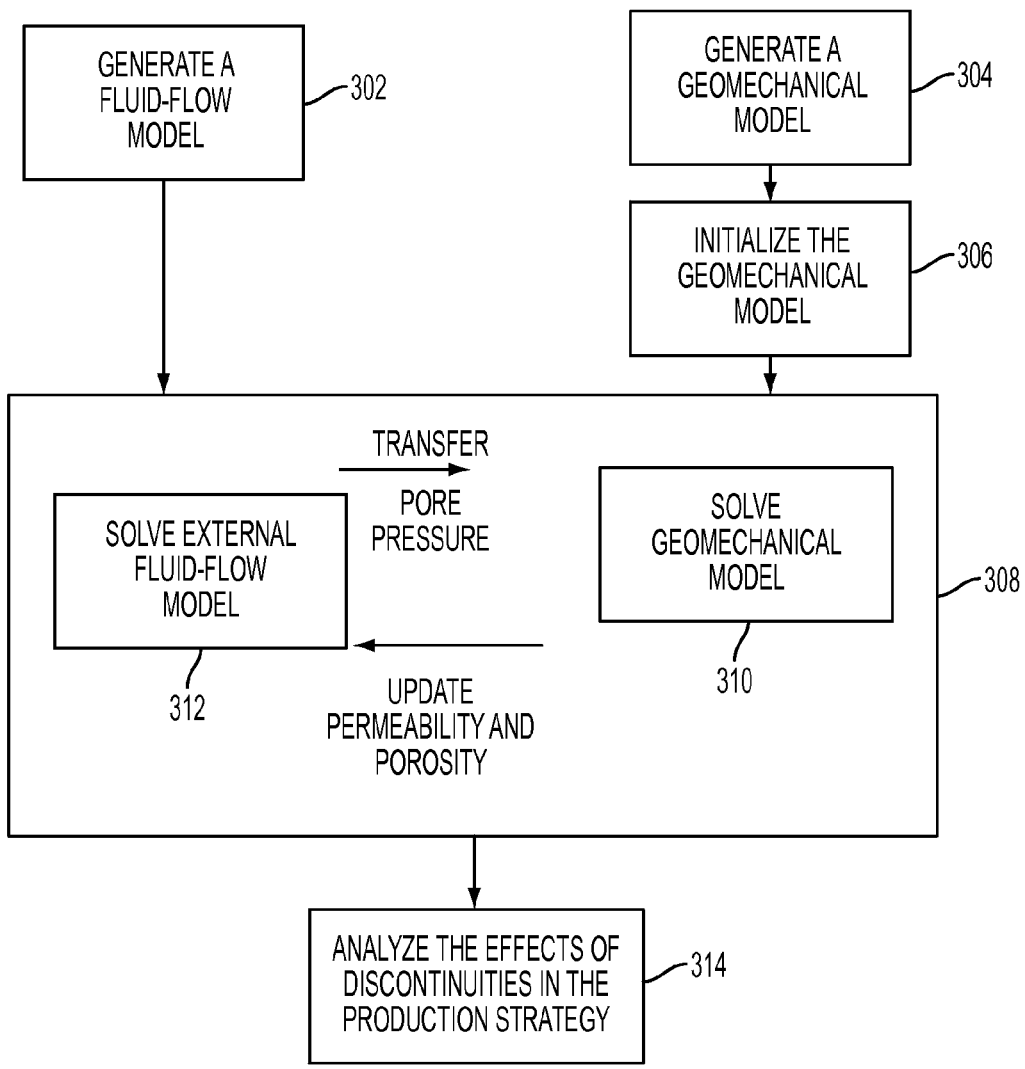
FIG. 3 illustrates a workflow for estimating the fluid pressure and state of stress of the solid frameworks for rocks in one embodiment of the present disclosure.

FIG. 3 illustrates a workflow for estimating the fluid pressure and state of stress of the solid frameworks for rocks in one embodiment of the present disclosure. At 302, a fluid-flow model is generated. At 304, a geomechanical model is generated, for example, as described with reference to FIG. 1. At 306, the geomechanical model is initialized to define the initial stress-strain which is compatible with measured stress in well locations with stress-strain observations. Direct stress measurement/estimations are normally obtained in wells and from well logs (e.g., Zoback, 2003, see paper at the site http://hera.wdcb.ru/tols/tecton/method/biblio/magn/Zoback_03.pdf).

At 308, a coupled solution of fluid-flow and geomechanical model is solved. In this process in one embodiment, the multiphase fluid-flow solution is solved first to estimate the pore-pressure in the reservoir and in the surrounding regions at 312. This pressure is passed to the geomechanical model which solves a stress-strain problem to calculate the stress and deformation in the rock solid framework at 310. After the stresses and strains are estimated, one the petrophysical properties of the reservoir such as porosity and permeability may be calculated and updated for the fluid flow model, and the process of solving the geomechanical model and the fluid flow model may iterate until the coupled solutions of fluid-flow and stress converge.

At 310, analysis of the results and calibration of the results with past production well data (history matching) may be performed. After calibration, the model may be used for forecasting of future performance of the reservoir, taking into account the effects of fractures and faults. Better reservoir management strategies (e.g., where to inject water) can be devised taking into account of potential opening or closing of these discontinuities.

Figure 4:
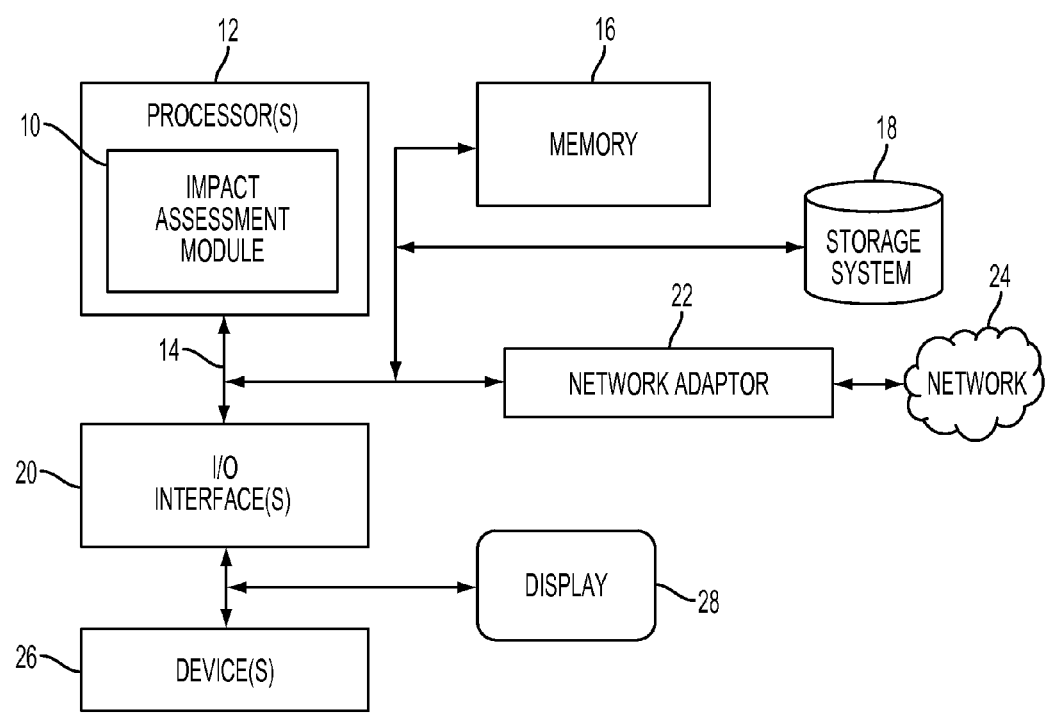
FIG. 4 illustrates a schematic of an example computer or processing system that may implement the system to assess the impact of existing fractures and faults for reservoir management in one embodiment of the present disclosure.

FIG. 4 illustrates a schematic of an example computer or processing system that may implement the system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include an impact assessment module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method to assess the impact of existing fractures and faults for reservoir management, comprising:
   generating a geological and reservoir model employing information from seismic data, well log, and well production data;
   defining one or more locations of one or more pre-existing geological faults or fractures or combination thereof;
   creating a numerical mesh that represents the generated geological model comprising delimitation associated with regions and layering of geology without constraining the numerical mesh to explicitly represent a fault or fracture;
   locating mesh elements from the numerical mesh that intersect the defined one or more locations;
   discretizing mesh elements of the numerical mesh that do not intersect the defined one or more locations of one or more pre-existing geological faults or fractures or combination thereof, according to a first numerical method;
   discretizing said located mesh elements that intersect the defined one or more locations of one or more pre-existing geological faults or fractures or combination thereof, according to a second numerical method;
   populating the numerical mesh elements with mechanical and flow properties, said populated numerical mesh forming a geomechanical model employed for assessing the impact of existing fractures and faults; and
   generating a fluid-flow model employing the numerical mesh,
   wherein a multiphase fluid-flow solution is solved first to estimate pore-pressure in the geological and reservoir model, the pore-pressure is passed to the geomechanical model that solves a stress-strain problem to calculate a stress and deformation in a rock solid framework associated with the geological and reservoir model, and petrophysical properties of the geological and reservoir model from the geomechanical model is updated for the fluid-flow model,
   the computer-implemented method determining changes in physical properties of a reservoir in hydrocarbon production,
   wherein the fluid-flow model and the geomechanical model comprise a computer-implemented model that predict future performance of the reservoir.

2. The method of claim 1, wherein the first numerical method comprises Galerkin Finite Elements method.

3. The method of claim 1, wherein the second numerical method comprises a numerical method that has enriched basis functions to model discontinuities caused by said geological faults or fractures embedded in the located mesh elements.

4. The method of claim 1, wherein the second numerical method comprises eXtended Finite Elements (XFEM) method.

5. The method of claim 1, wherein the mechanical properties comprise elastic, plastic, viscoplastic and viscoelastic properties.

6. The method of claim 1, wherein the flow properties comprise permeability and porosity.

7. The method of claim 1, wherein the location of a pre-existing geological fault or fracture or combination thereof is defined based on the seismic data and well log.

8. The method of claim 1, wherein the generated geological and reservoir model contains a reservoir and surrounding regions comprising overburden, underburden and sideburden.

9. The method of claim 8, wherein each of the surrounding regions has mechanical properties associated with said each respective surrounding region.

10. The method of claim 1, wherein geometry of the geological and reservoir model is defined as a polygonal surface.

11. A computer-implemented method to assess the impact of existing fractures and faults for reservoir management, comprising:
    employing a numerical mesh to generate a geomechanical model, the numerical mesh representing a geological reservoir and its surrounding regions, the numerical mesh comprising delimitation associated with regions and layering of geology without constraining the numerical mesh to explicitly represent a fault or fracture;
    initializing the geomechanical model to define initial stress-strain compatible with measured stress in well locations associated with the geological reservoir;
    generating a fluid-flow model employing the numerical mesh;
    solving for a coupled solution of the fluid-flow model and the geomechanical model; and
    employing the solved fluid-flow model and the geomechanical model to assess the impact,
    wherein a multiphase fluid-flow solution is solved first to estimate pore-pressure in the reservoir and in the surrounding regions, the pore-pressure is passed to the geomechanical model that solves a stress-strain problem to calculate a stress and deformation in a rock solid framework associated with the reservoir, petrophysical properties of the geological reservoir from the geomechanical model is updated for the fluid-flow model,
    the computer-implemented method determining changes in physical properties of the reservoir in hydrocarbon production,
    wherein the fluid-flow model and the geomechanical model comprise a computer-implemented model that predict future performance of the reservoir.

12. The method of claim 11, wherein the petrophysical properties comprises porosity and permeability.

13. The method of claim 11, wherein passing of estimated pore-pressure from the fluid-flow model to the geomechanical model and the updating of the petrophysical properties from the geomechanical model to the fluid-flow model are iterated until the coupled solutions of fluid-flow and geomechanical model converge.

14. The method of claim 11, further comprising calibrating a result of the coupled solution with past production well data.

15. The method of claim 11, further comprising employing the coupled solution to forecast future performance of the geological reservoir.

16. The method of claim 11, further comprising recommending reservoir management strategies based on analysis of the coupled solution.

17. The method of claim 16, wherein said strategies comprise potential opening or closing of discontinuities caused by said faults or fractures.

18. A non-transitory computer readable storage medium storing a program of instructions executable by a machine to perform a method to assess the impact of existing fractures and faults for reservoir management, the method comprising:
generating a geological and reservoir model employing information from seismic data, well log, and well production data;
defining one or more locations of one or more pre-existing geological faults or fractures or combination thereof;
creating a numerical mesh that represents the generated geological model comprising delimitation associated with regions and layering of geology without constraining the numerical mesh to explicitly represent a fault or fracture;
locating mesh elements from the numerical mesh that intersect the defined one or more locations;
discretizing mesh elements of the numerical mesh that do not intersect the defined one or more locations of one or more pre-existing geological faults or fractures or combination thereof, according to a first numerical method;
discretizing said located mesh elements that intersect the defined one or more locations of one or more pre-existing geological faults or fractures or combination thereof, according to a second numerical method;
populating the numerical mesh elements with mechanical and flow properties, said populated numerical mesh forming a geomechanical model; and
generating a fluid-flow model employing the numerical mesh,
wherein a multiphase fluid-flow solution is solved first to estimate pore-pressure in the geological and reservoir model, the pore-pressure is passed to the geomechanical model that solves a stress-strain problem to calculate a stress and deformation in a rock solid framework associated with the geological and reservoir model, and petrophysical properties of the geological and reservoir model from the geomechanical model is updated for the fluid-flow model, wherein the passing of estimated pore-pressure from the fluid-flow model to the geomechanical model and the updating of petrophysical properties from the geomechanical model to the fluid-flow model are iterated until the coupled solutions of fluid-flow and geomechanical model converge,
the method determining changes in physical properties of a reservoir in hydrocarbon production,
wherein the fluid-flow model and the geomechanical model comprise a computer-implemented model that predict future performance of the reservoir.

19. The non-transitory computer readable storage medium of claim 18, further comprising:
initializing the geomechanical model to define initial stress-strain compatible with measured stress in well locations associated with the geological and reservoir model;
solving for a coupled solution of the fluid-flow model and the geomechanical model; and
employing the solved fluid-flow model and the geomechanical model to assess the impact.

20. The non-transitory computer readable storage medium of claim 19, wherein the first numerical method comprises Galerkin Finite Elements method.

21. The non-transitory computer readable storage medium of claim 19, wherein the second numerical method comprises eXtended Finite Elements (XFEM) method.

22. A system to assess the impact of existing fractures and faults for reservoir management, comprising:
a processor;
an impact assessment module operable to generate a geological and reservoir model employing information from seismic data, well log, and well production data,
the impact assessment module further operable to define one or more locations of one or more pre-existing geological faults or fractures or combination thereof,
the impact assessment module further operable to create a numerical mesh that represents the generated geological model comprising delimitation associated with regions and layering of geology without constraining the numerical mesh to explicitly represent a fault or fracture,
the impact assessment module further operable to locate mesh elements from the numerical mesh that intersect the defined one or more locations,
the impact assessment module further operable to discretize mesh elements of the numerical mesh that do not intersect the defined one or more locations of one or more pre-existing geological faults or fractures or combination thereof, according to a first numerical method,
the impact assessment module further operable to discretize said located mesh elements that intersect the defined one or more locations of one or more pre-existing geological faults or fractures or combination thereof, according to a second numerical method,
the impact assessment module further operable to populate the numerical mesh elements with mechanical and flow properties, said populated numerical mesh forming a geomechanical model,
the impact assessment module further operable to generate a fluid-flow model employing the numerical mesh,
wherein a multiphase fluid-flow solution is solved first to estimate pore-pressure in the geological and reservoir model, the pore-pressure is passed to the geomechanical model that solves a stress-strain problem to calculate a stress and deformation in a rock solid framework associated with the geological and reservoir model, and petrophysical properties of the geological and reservoir model from the geomechanical model is updated for the fluid-flow model,
the impact assessment module operable to execute on the processor and determine changes in physical properties of a reservoir in hydrocarbon production,
wherein the fluid-flow model and the geomechanical model comprise a computer-implemented model that predict future performance of the reservoir.

23. The system of claim 22, wherein the impact assessment module further operable to initialize the geomechanical model to define initial stress-strain compatible with measured stress in well locations associated with the geological and reservoir model, solve for a coupled solution of the fluid-flow model and the geomechanical model, employ the solved fluid-flow model and the geomechanical model to assess the impact.

* * * * *